Dec. 26, 1967     C. D. FEDERLINE     3,360,128
CONNECTION AND FILTER
Filed Oct. 13, 1964     2 Sheets-Sheet 1
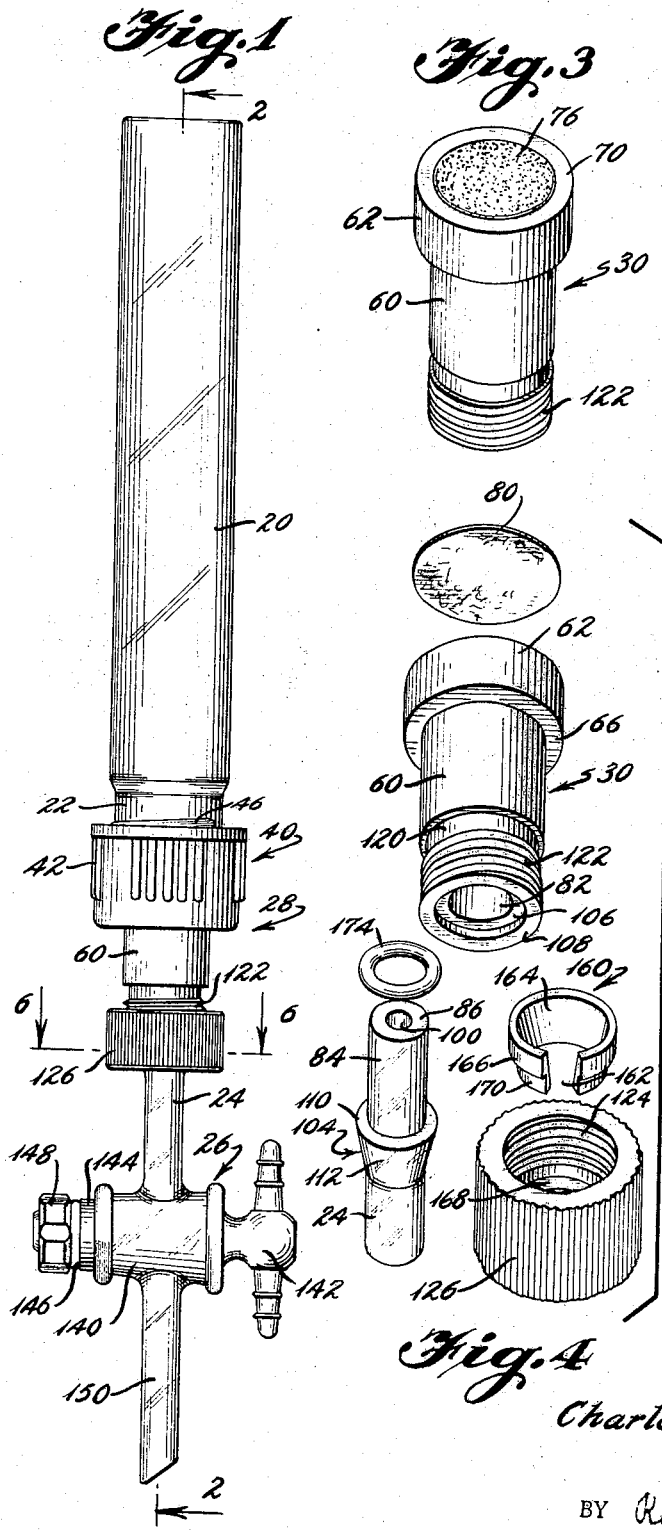
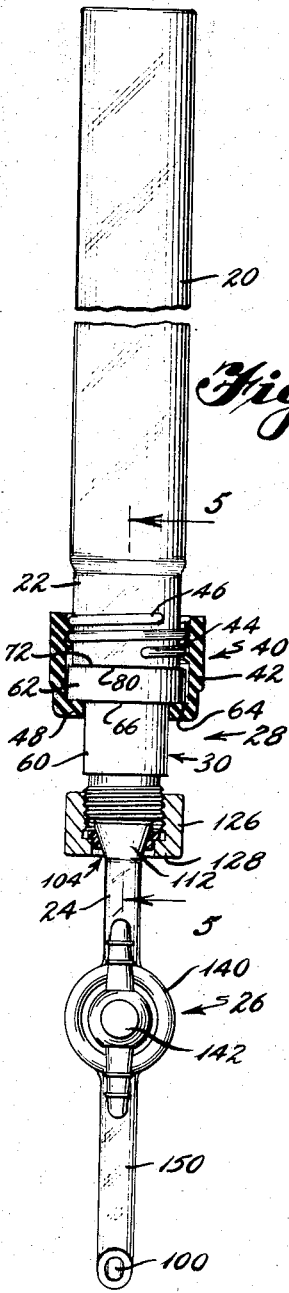
INVENTOR
Charles Donald Federline
BY Robert B. Buckley
ATTORNEY Dec. 26, 1967     C. D. FEDERLINE     3,360,128
CONNECTION AND FILTER
Filed Oct. 13, 1964     2 Sheets-Sheet 2
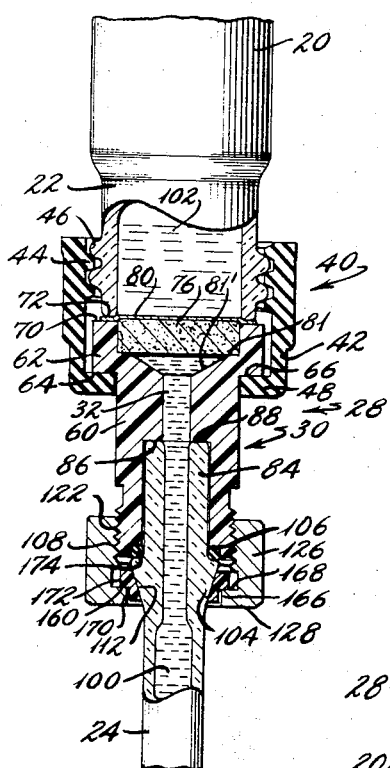
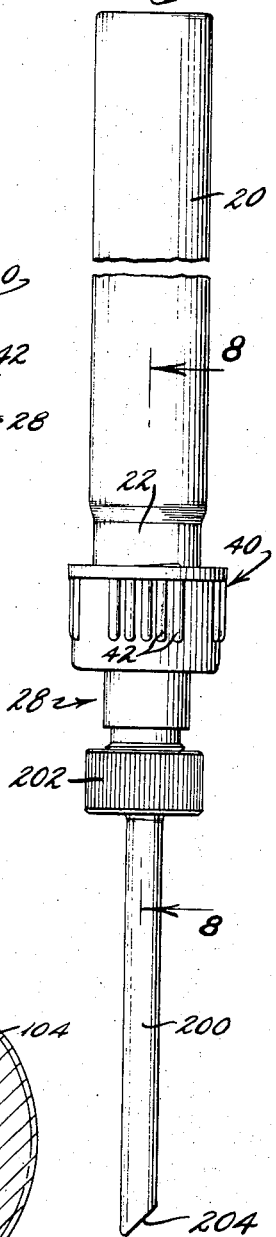
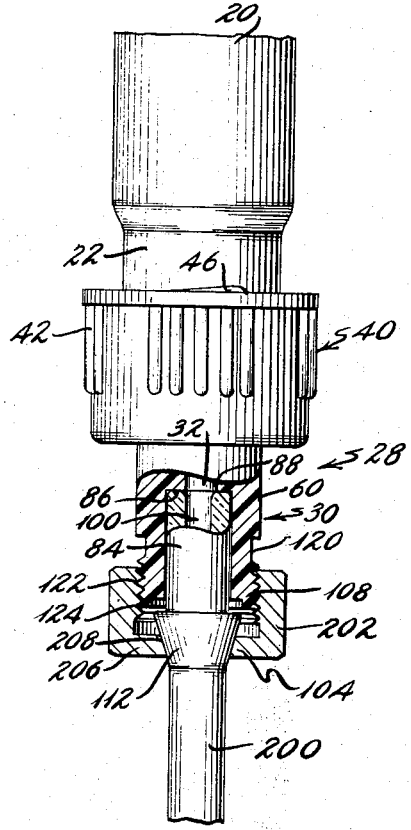
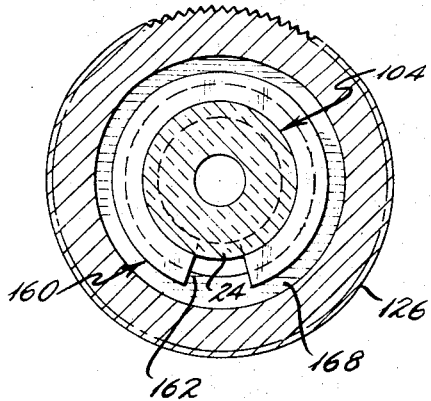
INVENTOR
Charles Donald Federline
BY Robert B. Buckley
ATTORNEY

United States Patent Office 3,360,128
Patented Dec. 26, 1967

3,360,128
CONNECTION AND FILTER
Charles Donald Federline, 124 Westmont Ave.,
Haddonfield, N.J. 08033
Filed Oct. 13, 1964, Ser. No. 403,584
1 Claim. (Cl. 210—94)

ABSTRACT OF THE DISCLOSURE

A filtering and connecting device consisting of an adapter, a large glass tube having a precisely finished end, a screw-threaded coupling to seal the adapter to the large glass tube, a threaded packing nut which when attached to the opposite end of the adapter applies pressure on a split ring which exerts a thrust on a small glass tube which compresses a flexible O-ring thereby accomplishing a second seal. By turning the packing nut further, pressure at the glass-adapter interface produces a chemically resistant third seal.

---

The present invention relates to chemical laboratory apparatus. More particularly, this invention relates to filtering, removing and drawing off the liquid contents of glass columns, such as chromatographic columns.

The invention provides a sealed connection between a glass column and a smaller glass outlet tube wherein solids are filtered and collected. The connectors are constructed of materials having a high level of inertness with respect to materials inside the laboratory glassware. The connectors are inexpensive, interchangeable and salvageable when breakage occurs to either or both glass tubes which they assemble.

The present invention resides in the concept of an assembly that connects a glass tube to a smaller outlet glass tube and filters the outflowing fluid. The connector is constructed with an adapter that is temperature-resistant and at least chemically-resistant so that the liquid flowing out from the larger glass tube will not be contaminated by materials of the connector. Nuts are provided engaging threads to press the ends of both glass tubes against surfaces of the adapter to provide seals. Thus an outflowing liquid contacts only glass and the chemically-resistant adapter. The connector and its parts can be transferred to other apparatus as desired, or when breakage of a member occurs.

The present invention provides a reducer for connecting a larger glass tube to a smaller glass tube and filtering the material flowing therebetween without contamination.

For a better understanding of the invention and its other objects, advantages and details, reference is now made to the presently preferred embodiments of the invention which are shown, for purposes of illustration only, in the accompanying drawings.

In the drawings:

FIGURE 1 is an assembly view shown in side elevation of a connection according to the invention;

FIGURE 2 is a longitudinal section on the line 2—2 in FIGURE 1;

FIGURE 3 is a perspective of the adapter and filtering element;

FIGURE 4 is an exploded perspective view illustrating some of the elements of the connection;

FIGURE 5 is a fragmentary enlarged sectional view taken on the line 5—5 in FIGURE 2;

FIGURE 6 is an enlarged transverse section on line 6—6 in FIGURE 5;

FIGURE 7 is an assembly view in side elevation of another form of connection according to the invention; and, FIGURE 8 is a fragmentary enlarged section on line 8—8 of FIGURE 7.

Briefly stated, the connection shown in FIGURES 1 to 6 includes an upper glass tube, such as a chromatographic column, with its lower end joined to a smaller glass tube and petcock by a connector including a filter.

The connector includes an adapter formed of material that is temperature-resistant and either chemically-resistant or chemically-inert. The adapter extends from the lip of the larger glass tube to the petcock tube. Nuts at opposite ends of the adapter engage threads to press the lips of each glass tube against opposite surfaces of the adaptor to form seals therewith. The adapter has a porous filter at its end adjacent the larger glass tube. The porous filter functions to retain solids in the larger tube, filter outflowing fluid, or support a filter paper for filtering and collecting solids. A bore is formed in the adapter and communicates with the porous filter and the bore of the smaller glass tube so as to form a continuous outlet channel from the lower end of the upper larger glass tube, through the pores of the filter, the bore of the adapter, and into the bore of the smaller glass tube.

The upper nut is called a coupling and engages external threads on the larger glass tube. The coupling has a collar abutting a flange on the adapter to transmit thrust to the adapter.

The lower nut is called a packing nut and engages external threads on the lower end of the adapter. For assembling and applying sealing pressure, the petcock tube is formed with a ridge. The nut has an inner diameter to pass over the ridge. A split ring is inserted between the packing nut and the ridge for transmitting thrust from the nut to the ridge and thus press the lip of the petcock tube into sealing engagement with the adapter.

The connection assembly shown in FIGURES 7 and 8 differs in that there is no petcock or other enlargement in the lower outlet glass tube. Thus there is no necessity for a split ring because the packing nut can be placed over the lower end of the outlet tube and brought up to abut the ridge on the outlet tube.

There now follows a detailed description of the embodiment of the invention illustrated in FIGURES 1 to 6.

An upper larger glass tube 20, such as a chromatographic column, has its narrower lower end 22 joined to an outlet glass tube 24 and petcock 26 by a connector 28. The connector 28 includes an adapter 30 formed of polytetrafluoroethylene, a material having temperature resistance and a high degree of inertness to solutions and mixtures in the larger glass tube 20 and passing through a bore 32 formed in the adapter 30.

To achieve a sealed channel from larger glass tube 20 through adapter bore 32 to outlet tube 24, pressure is applied to press the lips of the glass tubes against mating surfaces of the adapter 30. Coupling 40 connects larger glass tube 20 to adapter 30. The coupling 40 includes a generally-tubular sleeve 42 having internal threads 44 mating with the external threads 46 formed on the lower end 22 of larger glass tube 20. The coupling 40 has a collar 48 extending from its lower end inwardly. The collar 48 forms a hole receiving the body portion 60 of adapter 30. The body portion 60 has the general shape of a right-circular cylinder and is joined at its upper end to adapter flange 62.

In the connection assembly shown in FIGURES 1, 2 and 5, the upper radial surface 64 of coupling collar 48 abuts the lower radial surface 66 of adapter flange 62. Thus, as the coupling 40 is rotated relative to the upper glass tube 20, the threaded engagement moves the upper radial annular surface 70 of adapter flange 62 toward the annular lip 72 of larger glass tube 20. The lip 72 is ground and mechanically polished or fire polished.

The adapter flange 62 is formed with a cavity receiving a porous filter disc 76 formed of porous polytetrafluoroethylene or porous glass. Filter discs of various porosities can be employed, depending upon the function and materials to be filtered. A filter disc having a pore size of about 30 microns can be used.

In chromatography, the filter disc 76 retains the adsorbent bedding in tube 20 while the liquid passes through the pores.

The filter disc 76 can be seated in adapter 30 by heating the adapter to expand the cavity therein; placing in the cavity the filter disc with a diameter greater than the inner diameter of the cavity when the adapter is cool; and, cooling the adapter, whereby the cavity contracts and the filter disc is firmly gripped in position.

In FIGURES 1 to 6, the assembly includes a filter paper 80 of circular shape supported on filter disc 76 and having its periphery clamped between the large tube lip 72 and upper radial annular surface 70 of adapter flange 62. The filtered solids can be collected on filter paper 80 and subsequently analyzed.

The connection assembly can be used without the filter paper 80. In such uses, the filter disc 76 filters effluent from larger glass tube 20, and tube lip 72 engages adapter flange surface 70 to form a liquid, gas, vacuum and pressure seal.

For the passage of filtrate to the outlet tube 24, the adapter 30 is formed with the smaller bore 32 extending along the center thereof and having its upper end communicating with filter disc 76 and its pores. A larger bore 82, seen in perspective in FIGURE 4, is coaxial and communicating with smaller bore 32. The outlet tube 24 has its upper end 84 received in larger bore 82 and its radial end surface or lip 86, seen in perspective in FIGURE 4, in sealing contact with annular radial end surface 88 of larger bore 82. The lip 86 is ground and mechanically polished or fire polished.

The outlet tube bore 100 communicates with adapter smaller bore 32 to form a continuous outlet channel for fluid 102. This channel extends from chromatographic glass tube 20, through filter paper 80, the pores in filter disc 76, adapter inner bore 32, and outlet tube bore 100.

For purchase, the outlet tube 24 is formed with an annular ridge 104 at a position on the tube so as to be located, when the outlet tube lip 86 contacts larger bore radial surface 88, adjacent counterbore 106 formed in the lower rim or radial end surface 108 of adapter body portion 60. The annular ridge 104 has an upper radial annular surface 110 and a generally frusto-conical surface 112.

The adapter body portion 60 includes a groove 120 and a threaded lower part 122 mating with the internal threads 124 in packing nut 126, shown detached in FIGURE 4. The packing nut 126 has a flange 128 extending inwardly for applying pressure to outlet tube ridge 104 and thus press the lip 86 into engagement with bore surface 88 to form a liquid, gas, vacuum and pressure seal between the outlet tube 24 and adapter 30. The outlet tube 24 includes the petcock 26 comprising a glass shell 140 and a plug 142 held in the shell 140 by a ring 144, washer 146, and nut 148 threaded onto the end of plug 142. The plug 142, ring 144 and nut 148 are formed of polytetrafluoroethylene.

Because of the obstruction presented by the petcock 26, the packing nut 126 cannot be assembled on the lower end 150 of petcock tube 24 and brought up to ridge 104. It is necessary to put the packing nut 126 on the upper end 84 of outlet tube 24 and bring it down over ridge 104. Therefore, the packing nut flange 128 is formed with an inner diameter greater than the outer diameter of ridge 104, so as to form a hole in the nut for passing ridge 104.

For transmitting thrust from packing nut 126 to outlet tube ridge 104, a split ring 160, shown in perspective detached in FIGURE 4, is placed around the outlet tube 24 by passing the tube 24 through the cleft 162 in the split ring 160. The split ring 160 has a frusto-conical inner surface 164 mating with the frusto-conical surface 112 of tube ridge 104. For engaging the packing nut flange 128, the split ring 160 is stepped with a radial shoulder 166 abutting the inner radial surface 168 of packing nut flange 128, a smaller portion 170 received in the hole formed by the nut flange 128, and a larger portion 172 received in the bore of packing nut 126.

With an O-ring 174 in counterbore 106, and with the split ring 160 assembled as shown in FIGURES 2 and 5, the seal is effected by rotating the packing nut 126 relative to adapter 30 so as to advance the engagement of the threads. Thrust is transmitted from nut flange 128 through split ring 160 to ridge 104. The primary seal is effected by the engagement of glass outlet tube lip 86 with polytetrafluoroethylene adapter surface 88. The O-ring 174 is compressed between the counterbore surface and the annular radial surface 110 of ridge 104. The O-ring 174 is used when greater sealing is required, as when pressure heads of greater than six feet of solvent are to be used inside the system, or when a high vacuum is to be produced inside the system.

The O-ring can be omitted when lesser sealing is required. Without the O-ring, the glass-to-tetrafluoroethylene seals provide leak-proof liquid seals against pressure conditions up to six feet heads of solvent, such as acetone.

The embodiment of the invention illustrated in FIGURES 7 and 8 is generally similar to that shown in FIGURES 1 to 6 and like parts have like reference numerals. The embodiment of FIGURES 7 and 8 differs in that the glass outlet tube 200 has no petcock or other enlargement. Hence, there is no necessity for the split ring. The packing nut 202 is placed on the lower end 204 of outlet tube and brought up to the position shown. The packing nut flange 206 has a frusto-conical inner surface 208 mating with and engaging the frusto-conical surface 112 of tube ridge 104. Thus, the nut flange 206 directly applies the sealing thrust to the tube ridge 104.

The adapter 30 can be formed of a material that is temperature-resistant and either chemically-resistant or chemically inert, according to the systems to be processed and the service requirements. Among the more inert materials are polyfluorocarbons, as polytetrafluoroethylene sold under the trademark "Teflon," polytrifluorochloroethylene sold under the trademark "Kel-F," and the like.

Coupling 40 can be formed of various materials, such as halocarbon. Split-ring 160 can be formed of various materials, among which is polytetrafluoroethylene.

The O-ring 174 can be formed of material that is temperature-resistant, and either chemically-resistant or chemically-inert, and elastic. Among the elastomers that can be used are Buna, silicones, and the fluoroelastomer sold under the trademark "Viton."

The packing nut 126 can be formed of various materials, among which are metals, such as aluminum and stainless steel; and synthetic resins such as polyethylene, polypropylene, polytrifluoroethylene and polytetrafluoroethylene.

Thus it will be seen that the invention provides assemblies for connecting larger glass tubes to smaller glass tubes and filtering the materials passing from one to the other. The assemblies provide adequate sealing according to the systems used. The assemblies prevent contamination of the materials inside the glass system by providing that the materials contact only glass and an adapter formed of material that has a high level of chemical inertness. The assemblies, and the parts thereof, are interchangeable when parts wear or break or when new systems are desired.

While presently preferred embodiments of the invention have been illustrated and described, it will be recognized that the invention can be otherwise variously embodied and practiced within the scope of the following claim.

What is claimed is:

A connection assembly comprising: an adapter including a tubular body portion having external threads formed on one end and a flange formed on the other end, said flange having a tubular cavity formed in its end face, a porous filter disc seated in said cavity, said adapter body portion having a smaller bore extending along the center thereof and having one end opening into said cavity, said adapter body portion having a larger bore coaxial and communicating with said smaller bore, the threaded end of said body portion having a counterbore formed around the mouth of said larger bore; a smaller glass tube having its end portion received in said larger bore, the radial end surface of said smaller glass tube abutting the radial end surface of said larger bore, the bore of said smaller glass tube communicating with said smaller bore, said smaller glass tube having an annular ridge formed thereon and positioned opposite said counterbore; said ridge having a radial surface nearest said tube end and a frusto-conical portion; a flexible O-ring positioned in said counterbore and abutting said ridge; a packing nut threadedly engaging the threaded end of said adapter body portion, said packing nut having a threaded bore and a flange extending inwardly at its outer end and forming a hole receiving said smaller glass tube, the inner diameter of said nut flange being greater than the outer diameter of said glass tube ridge to permit said nut flange to pass over said glass tube ridge; a flexible split ring received in the bore of said packing nut and positioned between the nut flange and said glass tube ridge, the cleft in said split ring permitting said split ring to be placed around said smaller glass tube from the side, said split ring having a frusto-conical inner surface mating with the frusto-conical surface of said glass tube ridge, the outer surface of said split ring being stepped with a radial shoulder abutting the inner radial surface of said nut flange, a smaller portion received in the hole formed by said nut flange, and a larger portion received in said nut bore; a coupling for connecting said adapter to a larger glass tube, said coupling including a sleeve internally-threaded for mating with external threads on a larger glass tube, said coupling further including a collar extending inwardly at one end of said sleeve and engaging the inner radial surface of said adapter flange; whereby, advancing the threaded engagement of said packing nut on said adapter causes said split ring to exert a thrust on said tube ridge to press said radial end surface of said smaller glass tube into sealing engagement with the radial end surface of said larger bore in said adapter, and compresses said O-ring to form a seal between said ridge and the surface of said counterbore, and advancing the threaded engagement of said coupling on a larger glass tube moves the lip of the larger glass tube into sealing engagement with the outer radial surface of said adapter flange.

References Cited
UNITED STATES PATENTS

| | | | |
|---|---|---|---|
| 1,993,732 | 3/1935 | Bijur | 285—177 X |
| 2,391,220 | 12/1945 | Bech | 285—177 X |
| 3,250,395 | 5/1966 | Blume | 210—317 X |

SAMIH N. ZAHARNA, *Primary Examiner.*